J. DE W. WHIPPLE.
HORSE COLLAR.
APPLICATION FILED OCT. 12, 1907.
922,988.
Patented May 25, 1909.
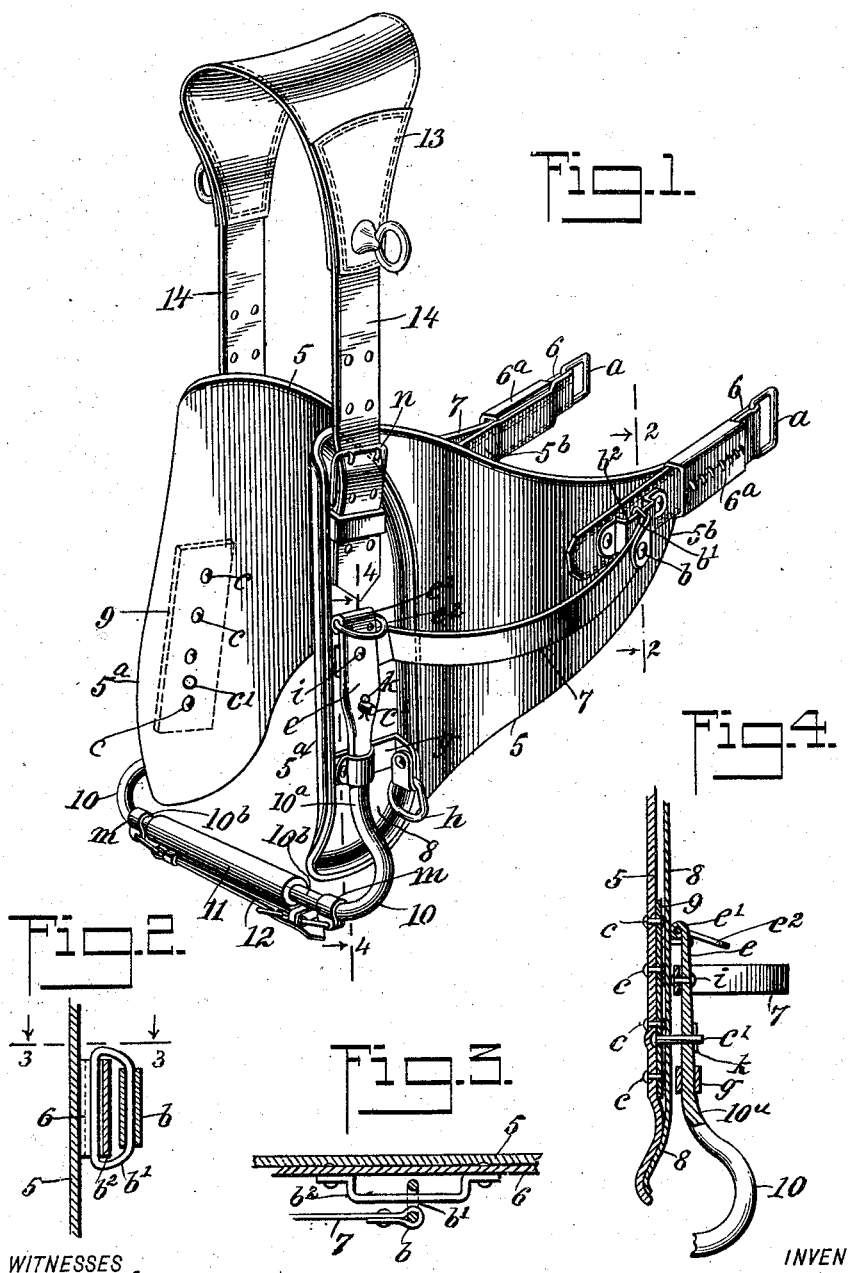
WITNESSES
INVENTOR
John D Whipple
BY
ATTORNEYS

UNITED STATES PATENT OFFICE.

JOHN DE WITT WHIPPLE, OF OMAHA, NEBRASKA.

HORSE-COLLAR.

No. 922,988.     Specification of Letters Patent.     Patented May 25, 1909.

Application filed October 12, 1907. Serial No. 397,085.

*To all whom it may concern:*

Be it known that I, JOHN D. WHIPPLE, a citizen of the United States, and a resident of Omaha, in the county of Douglas and State of Nebraska, have invented new and useful Improvements in Horse-Collars, of which the following is a full, clear, and exact description.

My invention relates to draft collars for horses or other draft animals, of a kind wherein draft leathers are employed, which engage the shoulders of a horse and dispense with padding.

My particular object in this invention is to provide novel features of improvement, for the horse collar patented by me, December 19, 1905, No. 807,523, whereby the construction is simplified, and the connections to the draft leathers are adapted for self adjustment, to accommodate a difference in the line of draft strain due to a high or low hitch upon the object to be drawn. Furthermore to dispense with objectionable projections from the draft-leathers, and obviate wear of parts by changing their construction while effecting a like function.

The invention consists in the novel construction and combination of parts, as is hereinafter described and defined in the appended claims.

Reference is to be had to the accompanying drawings forming a part of this specification, in which similar characters of reference indicate corresponding parts in all the figures, in which—

Figure 1 is a perspective view of the improved horse collar; Fig. 2 is an enlarged transverse sectional view, substantially on the line 2—2 in Fig. 1; Fig. 3 is a partly sectional plan view of details, substantially on the line 3—3 in Fig. 2; and Fig. 4 is an enlarged partly sectional front view of novel details, substantially on the line 4—4 in Fig. 1.

The draft leathers 5, 5, that are main portions of the collar, are similar to those provided in the patented collar No. 807,523, and briefly described said similar side pieces each consist of a strong piece of leather or other suitable material, having a sufficient width at the front end $5^a$ for effective service. From the front end each draft leather 5, tapers toward the opposite end thereof and upon said rear portion $5^b$ there is a tug strap 6, lapped and secured by sewing or other means. The tug strap 6, on each draft leather 5, may have a keeper loop $6^a$ secured thereon to receive the end of a trace strap, not shown, and on the free ends of the tug straps metal rings $a$, of quadrangular form are secured that may be engaged by ends of traces, not shown.

A spring plate 7, that is a strip of resilient metal is provided for each draft leather, and said similar plates are each curved to give them arcuate form. The spring plates 7 are not here presented as broadly new elements for the collar, as they are shown in my patented collar; but their means of connection with the draft leathers is novel and very advantageous, as will appear from the following description thereof.

Each spring plate 7, which for convenience I term a longitudinally extending side plate, is formed at its normally rear end with a return bent loop $b$, or said loop may be secured upon the end of the plate. In the loop $b$, is loosely secured an oblong ring $b'$, as is plainly shown in Figs. 2 and 3, this ring also engaging the flat body of an elongated keeper plate $b^2$, that is off-set near each end, to provide flanges thereon which are each riveted upon the lapped portion of a tug strap, that is secured on the corresponding end of a respective draft leather. It will be noted that the connection of the ends of the arcuate side plates 7, with the rear ends of the draft leathers 5, permits a to and fro movement of said ends, which is essential to accommodate the muscular movement of a horse's shoulders when walking.

The front end portions $5^a$ of the draft leathers 5, are reinforced by means of two similar side plates 8 that may also be termed neck rolls, that are concaved near their edges thus stiffening them, said edges projecting outward on each side plate, as is plainly indicated for one plate in Fig. 1, where it will be noted that the length of each side plate 8 is about equal to the width of the front portions of the draft leathers 5, and the lower ends of these plates are curved toward each other, thus giving concave form to the lower edges of the draft leathers where they bear upon the breast of the beast whereon the collar may be placed. The provision of the side plates 8 for the draft leathers is not new in this case as they are shown in my former patent, but the means for mounting them on said leathers is novel, constituting an essential feature of the present invention and consisting of the following details.

As shown by dotted lines in Fig. 1, and in longitudinal section in Fig. 4, a flat metal rock plate or anchor plate 9 is secured by rivets $c$, upon the outer surface of each draft leather, near the front edge and transverse center thereof. Upon each anchor plate a strong pivot stud $c'$, is loosely secured by a head on one end, and thence projects outward through a respective side-plate.

A laterally adjustable yoke piece comprising two similar members 10, 10, that are the equivalents of a pair of hames is employed for spacing apart and holding the side plates 8 so that they will move together, and as shown in Fig. 1 the two-part yoke piece is constructed as follows: Each member or hame 10, is bent between its ends into a short curve forming two limbs $10^a$, $10^b$, that diverge at an angle of ninety degrees from each other. The limb $10^a$ on each member 10 normally projects upward, and terminates at the upper end in a flattened leaf $e$, which terminates in a tabulation $e'$, which carries loosely a bail ring $e^2$, the use of which is not material in this invention. On the side-plate or neck roll 8 for each draft leather, below the leaf $e$ a clip plate $g$ is secured, which embraces the upright limb $10^a$, thus holding it upon said side-plate, and upon an extension of each clip plate a ring $h$ is loosely secured that may receive a strap which is immaterial in this improvement. The engagement of the limb $10^a$ with the clip plate $g$, serves to space the leaf $e$, from the adjacent neck roll or side plate 8, and into said space a straight, flat, forward end portion of a respective arcuate spring side plate 7, is inserted and pivoted, the pivot $i$ passing through the leaf $e$ and is secured thereto, thus adapting the spring side plate 7, to rock at its forward end upon the side-plate 8 and leaf $e$. The pivot stud $c'$, before mentioned, which at the inner end thereof has a rocking engagement with the anchor or rock plate 9, projects outward from the side plate 8, it passes through and also through the leaf $e$, that is adjacent to said plate or neck roll. Preferably the pivot stud $c^1$, for each side-plate 8, leaf $e$ and draft leather 5, is held at its end that projects through a respective leaf, by a split key $k$. The laterally extending limbs $10^b$ formed on both yoke members or hames 10, 10, are axially alined, and upon one of said limbs a coupling sleeve 11 is loosely mounted but is secured to the other limb after it is mounted thereon, thus holding the limbs in sliding relation to the sleeve, whereby the draft leathers may be spaced apart more or less, to fit upon horses of different breadth between their shoulders.

To secure the hame or yoke piece members 10, at a proper point of separation for the draft leathers 5, a strap 12 is employed which engages a clip band $m$ on each limb $10^b$ as shown in Fig. 1.

It is to be understood that while the use of the yoke coupling just described is essential for the proper connection and adjustment of the draft leathers 5, such a sliding connection is not claimed as broadly new, having been shown in my Patent No. 807,523:—the feature of novelty embodied consisting in the provision of the leaf $e$, on each upright member $10^a$ of the two-part yoke piece.

A neck yoke 13 is mounted upon the draft leathers 5, 5, by means of pendent straps 14, that are adjustably secured upon the upper portions of the side plates 8, by buckles $n$, as shown for one side of the collar in Fig. 1. This detail, however, has already been shown in my patent hereinbefore mentioned.

It will be seen that by coupling the rear ends of the arcuate spring side plates 7, with the tug straps 6 and rear ends of the leathers 5, in loose engagement, by means of a ring on each plate end, engaging an elongated staple-like keeper plate $b^2$ fixed on the tug strap and draft leather, permits the spring plate to slide freely a proper distance, and by the improved means of connecting the ends of the spring plates with the draft leathers, objectionable projections are avoided. It will also be noted that by providing a pivotal connection between the draft leather 5 at each side of the collar, and a respective neck roll or side plate 8, the traces that in service are attached to the ends of the tug straps 6, may be coupled at their other ends with an object near the ground, such as a harrow, or to one considerably higher, and avoid discomfort to the animal on which the collar is placed. To further explain this advantageous construction as to the operation thereof, it should be understood that if the connection between each draft leather 5 and the side plate or neck roll 8 thereon is rigid, as well as the connection of the front end of a spring side plate 7 therewith, a low hitch of the ends of the traces on an object to be moved will shift the upper edge portions of the side plates 8 rearward somewhat, and by their impingement on the clavicle bone cause pain and discomfort. Furthermore if the line of draft-strain should be above a horizontal plane, the lower portions of the side plates or neck rolls 8 at their rear edges will bear improperly on the shoulders of the animal. So that it is very essential that the neck rolls 8 may be permitted to automatically adjust their positions, and thus compensate for any change in the line of draft imposed on the draft leathers and side plates.

Having described my invention, I claim as new, and desire to secure by Letters Patent:

1. A collar embodying a draft leather, a spring plate, means for loosely securing the front end of said spring plate upon the forward portion of the draft leather, and a sliding connection between the rear portion of the draft leather and corresponding end of the spring plate.

2. A collar embodying a pair of draft leathers, two side plates mounted forwardly on the draft leathers, a tug-strap on the rear end of each draft leather, a spring plate for each draft leather pivoted by one end on a respective side plate, and means for slidably connecting the rear ends of said spring plates with respective tug-straps.

3. A collar, embodying a pair of draft leathers, side plates loosely secured forwardly on the draft leathers, an arcuate spring plate for each draft leather pivoted at its front end upon a respective side plate, a tug strap on each draft leather at its rear end, an elongated keeper plate on each tug strap and rear end of a respective draft leather, and a coupling ring loosely mounted upon the rear end of each arcuate spring plate, said rings being loosely engaged with corresponding keeper plates.

4. A collar embodying a draft leather widened at the forward end, an upright side plate pivoted upon the forward portion of the draft leather, an elongated spring plate pivoted at its forward end on the side plate, and means for loosely securing the rear end of the spring plate upon a corresponding portion of the draft leather.

5. A collar, embodying a draft leather, a side plate pivoted thereon, a spring plate loosely secured at its rear end on the draft leather, and rockably mounted at its forward end upon the side plate.

6. A collar, embodying a pair of draft leathers that taper edgewise from front to rear, a side plate for each draft leather disposed vertically thereon at the front end, an anchor plate secured on the front end of each draft leather, a pivot stud loosely secured in each anchor plate and in a respective side plate and a spring plate for each draft leather, pivoted by one end on a side plate, and slidably mounted at the other end on an end of the draft leather.

7. A collar, embodying a pair of draft leathers, a side plate for each draft leather, an anchor plate secured on each draft leather, a pivot stud loosely secured in each anchor plate and in a respective side plate and an arcuate spring plate loosely secured by one end on a respective draft leather and at the opposite end pivoted upon a corresponding side plate.

8. A collar, embodying a pair of draft leathers, a side plate for each draft leather, an anchor plate secured on each draft leather, a pivot stud loosely secured in each anchor plate and in a respective side plate, a two-part yoke having leaves on two upright members thereof, an arcuate spring plate seated at one end on a respective side plate, each leaf lapping upon a respective end of a spring plate, a pivot connection between each side plate, spring plate and leaf, and a sliding connection between each spring plate and draft leather at the respective ends thereof.

9. A horse collar comprising hames, neck rolls secured thereto, rock plates pivotally connected with the rolls, and draft leathers secured to the rock plates.

10. A horse collar comprising hames, neck rolls secured thereto, draft leathers pivotally connected with the rolls, side plates secured at their inner ends to the hames, and keepers secured to the leathers and with which the outer ends of the side plates are slidably connected.

In testimony whereof I have signed my name to this specification in the presence of two subscribing witnesses.

JOHN DE WITT WHIPPLE.

Witnesses:
    MAY H. FINLEY,
    E. MARJORIE RATHKE.